United States Patent
Wu et al.

(10) Patent No.: US 8,466,625 B2
(45) Date of Patent: Jun. 18, 2013

(54) ILLUMINATION DEVICE AND METHOD CONTROLLING THE SAME

(75) Inventors: Chin-Hao Wu, Hsinchu County (TW); Ken-Chih Chang, Hsinchu County (TW); Hsiang-Yu Chen, Hsinchu County (TW)

(73) Assignee: Young Green Energy Co., Hsinchu County (TW)

( * ) Notice: Subject to any disclaimer, the term of this patent is extended or adjusted under 35 U.S.C. 154(b) by 148 days.

(21) Appl. No.: 13/217,207

(22) Filed: Aug. 24, 2011

(65) Prior Publication Data
US 2012/0062126 A1    Mar. 15, 2012

(30) Foreign Application Priority Data

Sep. 14, 2010   (CN) .......................... 2010 1 0281829

(51) Int. Cl.
*H05B 37/00* (2006.01)
(52) U.S. Cl.
USPC ............................ 315/149; 315/158; 315/307
(58) Field of Classification Search
USPC ................. 315/149, 158, 159, 156, 157, 291, 315/307, 308
See application file for complete search history.

(56) References Cited

U.S. PATENT DOCUMENTS

| 6,441,557 | B1 | 8/2002 | Asakura | |
|---|---|---|---|---|
| 7,518,320 | B2 | 4/2009 | Chen et al. | |
| 8,115,418 | B2 * | 2/2012 | Haubmann | 315/307 |
| 2010/0194301 | A1 * | 8/2010 | Okubo | 315/224 |
| 2010/0301755 | A1 * | 12/2010 | Pance et al. | 315/149 |

FOREIGN PATENT DOCUMENTS

| TW | 200721063 | 6/2007 |
|---|---|---|
| TW | I316592 | 11/2009 |

* cited by examiner

*Primary Examiner* — David H Vu
(74) *Attorney, Agent, or Firm* — Jianq Chyun IP Office

(57) ABSTRACT

An illumination device and a method controlling the same are provided. The illumination device produces a pulse width modulation signal to control an illumination light source of the illumination device. The illumination light source is used to illuminate an environment. A driver of the illumination device provides a current to the illumination light source so the illumination light source emits light and a light detecting element of the illumination device detects a first brightness in the environment when the pulse width modulation signal is at high potential. The driver stops providing the current to the illumination light source and the light detecting element detects a second brightness in the environment when the pulse width modulation signal is at low potential. Thus, through a single light detecting element, two different levels of brightness in the illuminated environment are detected.

10 Claims, 4 Drawing Sheets

ILLUMINATION DEVICE AND METHOD CONTROLLING THE SAME

CROSS-REFERENCE TO RELATED APPLICATION

This application claims the priority benefit of China application serial no. 201010281829.5, filed on Sep. 14, 2010. The entirety of the above-mentioned patent application is hereby incorporated by reference herein and made a part of this specification.

BACKGROUND OF THE INVENTION

1. Field of the Invention

The invention generally relates to an illumination device and a method of controlling the same. More specifically, the invention relates to an illumination device and a method for controlling the illumination device that uses a light detecting element for detecting brightness in an environment.

2. Description of Related Art

Light emitting diode (LED) light sources have advantages of energy saving, being environmental, a long life span, and a quick response time, and are currently used popularly in city road lights.

In the Taiwan Patent-issued No. 1316592, an LED lamp that could be remote controlled and includes a light source, a first and second light detecting element, and a control box is disclosed. The control box includes a memory and a communication chip. The first detecting element is used to detect the brightness in an environment. The second detecting element is used to detect the operating condition of the light source. Detected information is stored and recorded in the memory of the control box. The communication chip transmits the detected information to a remote control station.

In the patent application of the Taiwan publication No. 200721063, a display device that could automatically adjust brightness according to the brightness of the environment and includes a display control circuit, a brightness control unit, and a display light source is disclosed. The display device further includes a brightness adjustment circuit electrically connected to the display control circuit and the brightness control unit. The brightness adjustment circuit includes a light detection unit, a buffer unit and a coupling unit. The light detection unit is used to detect the brightness of the environment, and dynamically outputs a corresponding voltage signal.

In the U.S. Pat. No. 7,518,320, an exemplary LED control circuit, including an observation circuit, a sampling circuit, a controller, and a regulating circuit is disclosed. The observation circuit is used to detect brightness of ambient light so as to generate a voltage signal according to the detected brightness. The sampling circuit generates a control signal according to the voltage signal. The controller generates a selection signal according to the control signal. The regulating circuit connects to an LED driving circuit and is used to adjust the operation status.

In the U.S. Pat. No. 6,441,557, a circuit for controlling a light source that adjusts its brightness based on the ambient brightness is disclosed. A light sensor produces a signal corresponding to the ambient brightness. The signal is used for modulating the pulse width to control a transistor to change an average current of a light source, so the brightness of the light source will change according to the ambient brightness.

SUMMARY OF THE INVENTION

The invention provides an illumination device that could detect two different levels of brightness in an illuminated environment through a single light detecting element.

The invention provides a method of controlling the illumination device. The method causes a light detecting element to detect two different levels of brightness in an illuminated environment based on a potential of a pulse width modulation signal.

Other objects and advantages of the invention could be further illustrated by the technical features broadly embodied and described as follows.

In order to achieve one or a portion of or all of the objects or other objects, an embodiment of the invention provides a method of controlling the illumination device. The method includes producing a pulse width modulation signal. The method further includes providing a current to an illumination light source of the illumination device and detecting a first brightness of an environment illuminated by the illumination light source through a light detecting element when the pulse width modulation signal is at high potential such that the illumination light source emits light. The method further includes stopping providing the current to the illumination light source and detecting a second brightness of the environment illuminated by the illumination light source through the light detecting element when the pulse width modulation signal is at low potential.

An embodiment of the invention provides an illumination device. The illumination device includes an illumination light source, a light detecting element, a controller, and a driver. The illumination light source is used to illuminate an environment. The light detecting element is used to detect brightness in the environment. The controller is coupled to the light detecting element, and is used to produce the pulse width modulation signal. The driver is coupled to the controller and the illumination light source. When the pulse width modulation signal is at high potential, the driver of the illumination device provides the current to the illumination light source so the illumination light source emits light, and the light detecting element detects the first brightness of the environment. When the pulse width modulation signal is at low potential, the driver stops providing current to the illumination light source, and the light detecting element detects the second brightness of the environment.

In an embodiment of the invention, when the first brightness is greater than a first threshold, the controller decrease a duty cycle of the pulse width modulation signal, and when the first brightness is less than a second threshold, the controller increases the duty cycle of the pulse width modulation signal. The first threshold is greater than the second threshold.

In an embodiment of the invention, when the first brightness is greater than a first threshold, the driver reduces the current, and when the first brightness is less than a second threshold, the driver increases the current. The first threshold is greater than the second threshold.

In an embodiment of the invention, the controller determines whether the illumination light source operates abnormally according to a difference between the first brightness and the second brightness.

In an embodiment of the invention, the illumination light source includes at least one light emitting diode (LED).

In an embodiment of the invention, the illumination device causes the light detecting element to respectively detect a road brightness illuminated by the illumination light source and a road brightness not illuminated by the illumination light source based on the potential of the pulse width modulation signal. Thus, the cost of the illumination device is reduced.

Other objectives, features and advantages of the invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE PREFERRED EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
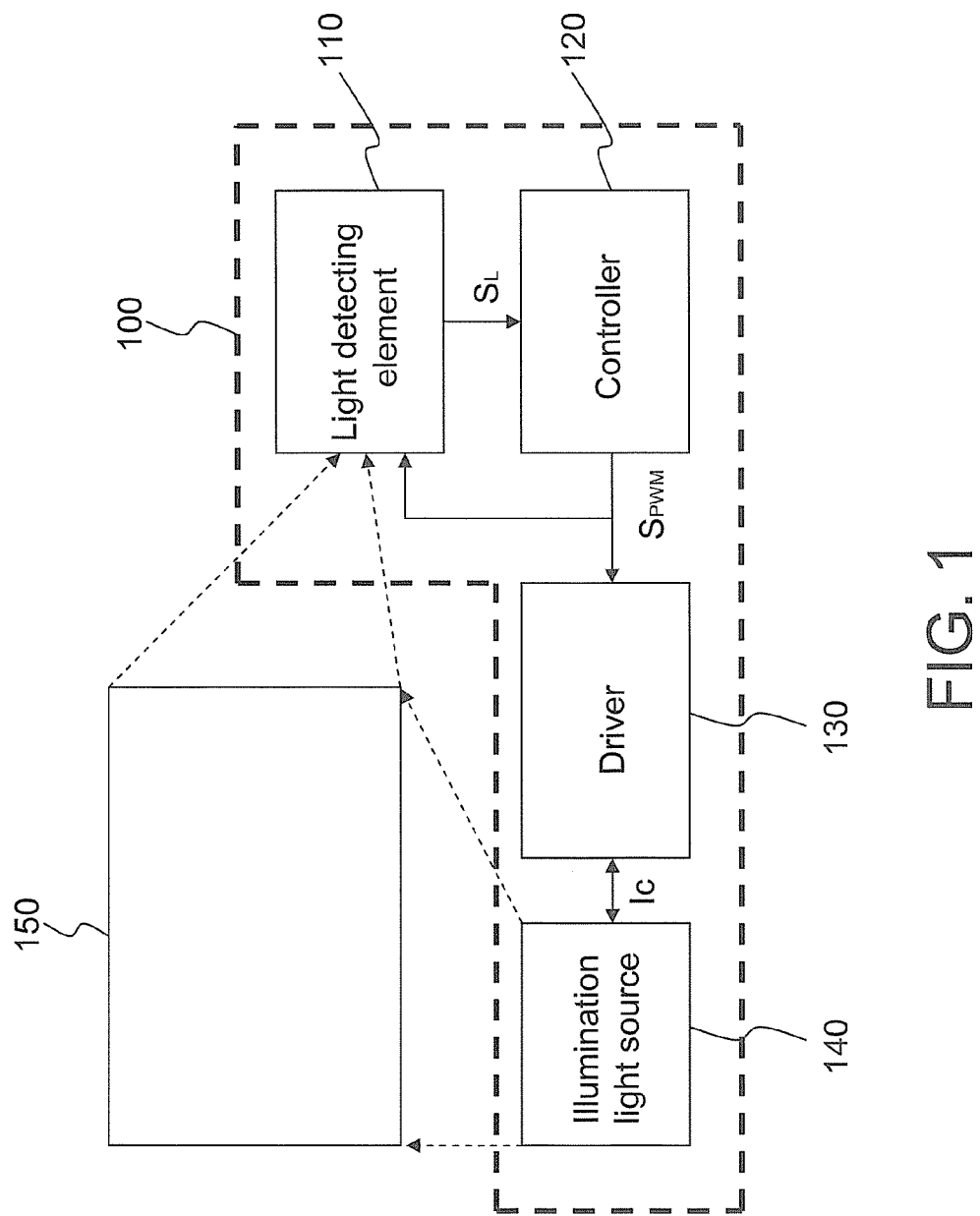
FIG. 1 is a functional block diagram schematically illustrating an illumination device of an embodiment of the invention.

Referring to FIG. 1, FIG. 1 is a functional block diagram schematically illustrating an illumination device 100 of an embodiment of the invention. The illumination device 100 includes a light detecting element 110, a controller 120, a driver 130, and an illumination light source 140. The illumination light source 140 used to illuminate an environment 150, and increase the brightness of the environment 150. The light detecting element 110 is used to detect the brightness of the environment 150, and outputs a road brightness signal $S_L$ according to the detected result. The controller 120 is coupled to the light detecting element 110 and the driver 130, and is used to produce a pulse width modulation (PWM) signal $S_{PWM}$. The driver 130 is coupled to the controller 120 and the illumination light source 140, and outputs a current Ic according to the pulse width modulation signal $S_{PWM}$, to drive the illumination light source 140 to emit light.

In an embodiment of the invention, the illumination light source 140 includes at least one light emitting diode (LED). Nevertheless, the invention should not be construed as limited to the embodiments set forth herein. For example, in an embodiment of the invention, the illumination light source 140 could be a cold cathode tube.

The controller 120 controls the output of the illumination light source 140 through the pulse width modulation for saving power. For example, at midnight, the illumination light source 140 needs greater output power to maintain the brightness in the environment. However, at dusk or dawn there is still a weak light in the environment, and so the illumination light source 140 requires a less amount of output power to maintain the brightness of the environment.

Figure 2:
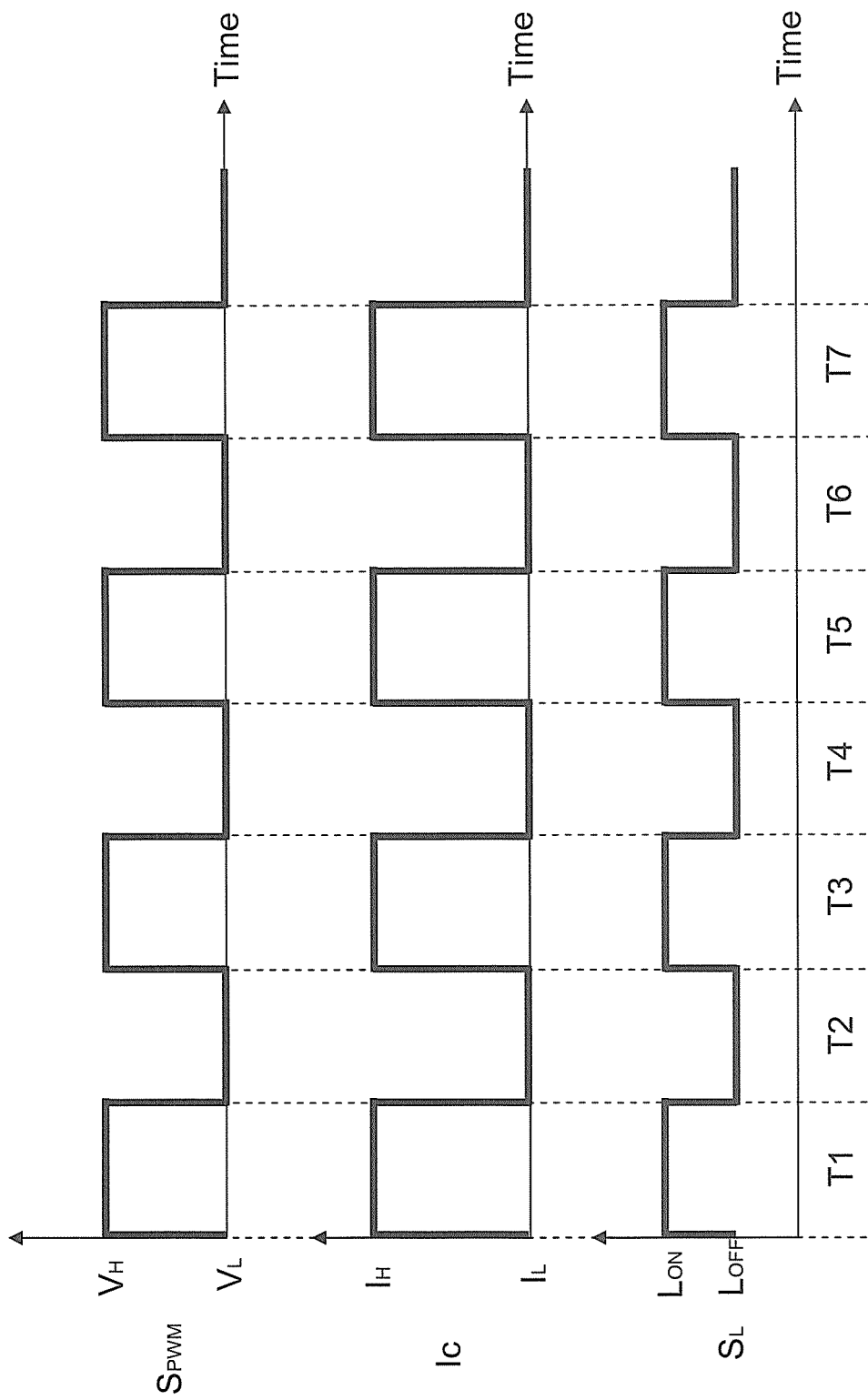
FIG. 2 is a timing diagram of each of the signals of the illumination device of FIG. 1.

Please refer to FIG. 1 and FIG. 2. FIG. 2 is a timing diagram of each of the signals of the illumination device 100 in FIG. 1. The pulse width modulation signal $S_{PWM}$ switches under high potential $V_H$ and low potential $V_L$. As shown in FIG. 2, the pulse width modulation signal $S_{PWM}$ is at high potential $V_H$ in the time zones T1, T3, T5, and T7, and the pulse width modulation signal $S_{PWM}$ is at low potential $V_L$ in the time zones T2, T4, and T6. When the pulse width modulation signal $S_{PWM}$ is at high potential $V_H$, the driver 130 provides the current Ic to the illumination light source 140, and the value of the current Ic is equal to a first current $I_H$. When the pulse width modulation signal $S_{PWM}$ is at low potential $V_L$, the driver 130 provides the current Ic to the illumination light source 140, and the value of the current Ic is equal to a second current $I_L$. In the embodiment, the light detecting element 110 is a single light detecting element, the second current $I_L$ is equal to zero, and the first current $I_H$ is greater than zero. In addition, when the current Ic is equal to the first current $I_H$, the illumination light source 140 will emit light, causing the brightness of the environment 150 detected by the light detecting element 110 to equal to a first brightness $L_{ON}$. When the current Ic is equal to the second current $I_L$, the illumination light source 140 will stop emitting light, causing the brightness of the environment 150 detected by the light detecting element 110 to equal to a second brightness $L_{OFF}$. The first brightness $L_{ON}$ is greater than the second brightness $L_{OFF}$. It could be seen that when the pulse width modulation signal $S_{PWM}$ is at high potential $V_H$, the driver 130 of the illumination device provides the current Ic to the illumination light source 140 so the illumination light source 140 emits light. Thus, the brightness of the environment 150 that the light detecting element 110 detects is the first brightness $L_{ON}$. When the pulse width modulation signal $S_{PWM}$ is at low potential $V_L$, the driver 130 stops providing current Ic to the illumination light source 140, and the brightness of the environment 150 that the light detecting element 110 detects is the second brightness $L_{OFF}$. The first brightness $L_{ON}$ represents a brightness of the environment 150 with the illumination of the illumination light source 140, and the second brightness $L_{OFF}$ represents a brightness of the environment 150 without the illumination of the illumination light source 140. Thus, the illumination device 100 could respectively detect a brightness (or a road brightness) of the environment 150 with the illumination of the illumination light source 140 and without the illumination of the illumination light source 140 through a single light detecting element 110.

Figure 3:
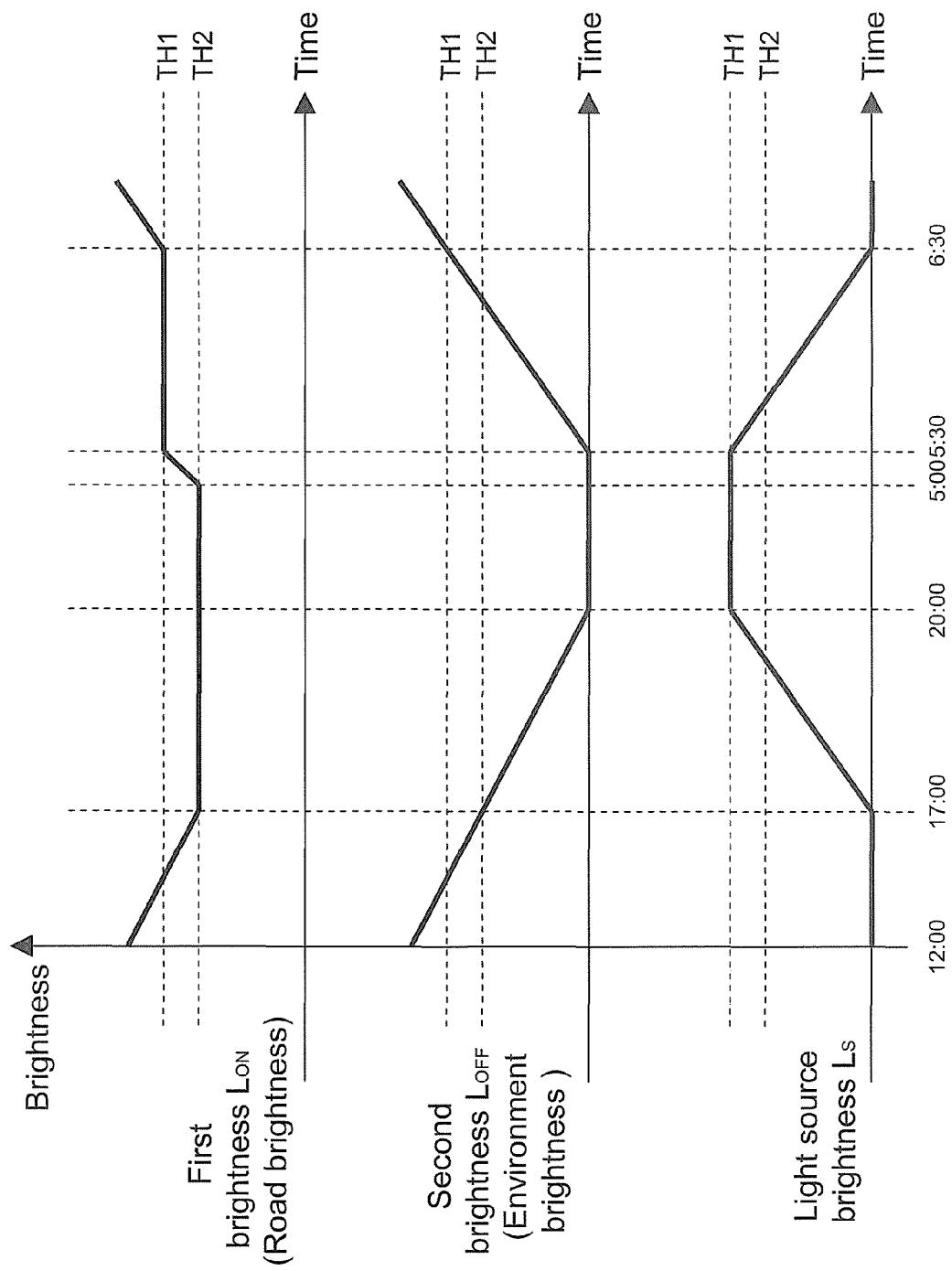
FIG. 3 is a timing diagram of the first brightness, the second brightness, and the corresponding brightness of the illumination light source detected by the light detecting element of FIG. 1.

Furthermore, to avoid the light source 140 from flickering because of rapid and repeated changes in the brightness of the environment, in the embodiment of the invention, the illumination device 100 will further control the light emitting of the illumination light source 140 according to a first threshold TH1 and a second threshold TH2. Please refer to FIG. 1 and FIG. 3. FIG. 3 is a timing diagram of the first brightness $L_{ON}$, the second brightness $L_{OFF}$, and a corresponding brightness $L_S$ of the illumination light source detected by the light detecting element of FIG. 1. The horizontal axis in FIG. 3 represents time, and in order to simplify the description, time is expressed in 24 hours. The first brightness $L_{ON}$, the second brightness $L_{OFF}$, and the corresponding brightness $L_S$ of the illumination light source has the following relationships:

$$L_{ON}=L_S+L_{Ambient}$$

$$L_{OFF}=L_{Ambient}$$

$$L_S=L_{ON}-L_{OFF}$$

$L_{Ambient}$ is the brightness that is provided from light in the environment, and the illumination light source brightness $L_S$ is equal to the difference between the first brightness $L_{ON}$ and the second brightness $L_{OFF}$.

FIG. 3 shows a general variation in the first brightness $L_{ON}$, the second brightness $L_{OFF}$, and the illumination light source brightness $L_S$ in a typical day. During the time (e.g. 12:00~20:00) the second brightness $L_{OFF}$ (i.e. environment brightness) gradually reduces, the illumination device 100 will gradually change the illumination light source brightness $L_S$ according to the first brightness $L_{ON}$ or/and the second brightness $L_{OFF}$ and the first threshold TH1 or/and the second threshold TH2, so as to maintain the first brightness $L_{ON}$ to be approximately less than the first threshold TH1 and greater than the second threshold TH2 at that time. In detail, during the time when the second brightness $L_{OFF}$ gradually reduces, the controller 120 will compare the first brightness $L_{ON}$ or/and the second brightness $L_{OFF}$ and the second threshold TH2. If the first brightness $L_{ON}$ or/and the second brightness $L_{OFF}$ is less than the second threshold TH2, then the controller 120 will gradually increase the illumination light source brightness $L_S$. If the second brightness $L_{OFF}$ is greater than the second threshold TH2, then the controller 120 will stop the illumination light source 140 from emitting light.

On the other hand, during the time (e.g. 5:30~6:30) the second brightness $L_{OFF}$ (i.e. environment brightness) gradually increases, the illumination device 100 will gradually change the illumination light source brightness $L_S$ according to the first brightness $L_{ON}$ or/and the second brightness $L_{OFF}$ and the first threshold TH1 or/and the second threshold TH2, so as to maintain the first brightness $L_{ON}$ to be approximately less than the first threshold TH1 and greater than the second threshold TH2 at that time. In detail, during the time when the second brightness $L_{OFF}$ gradually increases, the controller 120 compares the first brightness $L_{ON}$ with the second brightness $L_{OFF}$, and the first threshold TH1. If the first brightness $L_{ON}$ is greater than the first threshold TH1, then the controller 120 will gradually reduce the illumination light source brightness $L_S$. If the second brightness $L_{OFF}$ is greater than the first threshold TH1, then the controller 120 will stop the illumination light source 140 emitting light.

Figure 4:
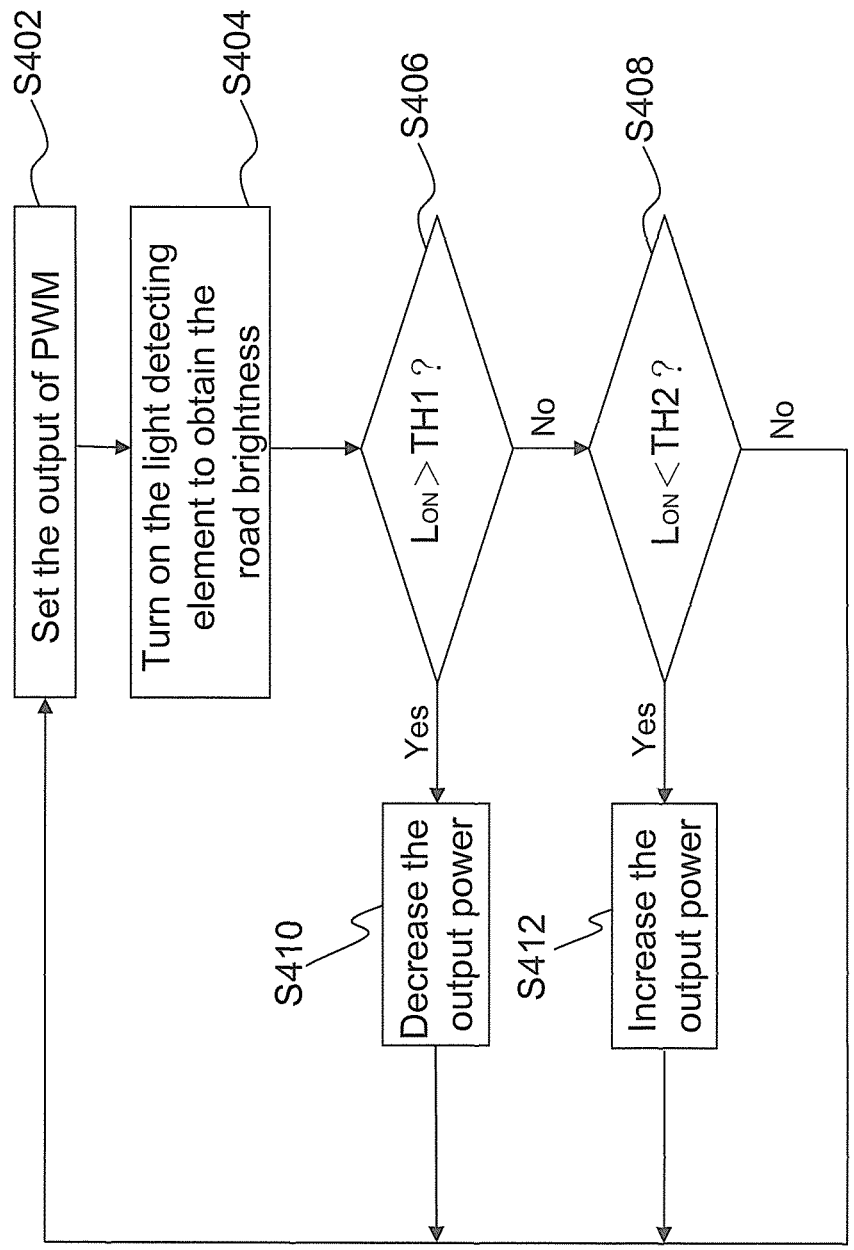
FIG. 4 is a flow chart of the output power used to adjust the illumination light source according to an embodiment of the invention.

Please refer to FIG. 4. FIG. 4 is a flow chart of the output power used to adjust the illumination light source 140 according to an embodiment of the invention. As previously mentioned, the controller 120 controls the illumination light source 140 output through the pulse width modulation, to save energy. In step S402, the controller 120 sets the output of the pulse width modulation signal $S_{PWM}$. Generally speaking, setting the output of the pulse width modulation signal $S_{PWM}$ is to set a duty cycle of the pulse width modulation signal $S_{PWM}$. Next, in step S410, the driver 130 outputs the corresponding current Ic according to the pulse width modulation signal $S_{PWM}$, and the controller 120 then turns on the light detecting element 110 to obtain the first brightness $L_{ON}$. In step S406, the controller 120 compares the first brightness $L_{ON}$ with the first threshold TH1. If the first brightness $L_{ON}$ is greater than the first threshold TH1, the duty cycle of the pulse width modulation signal $S_{PWM}$ is decreased, which reduces the output power of the illumination light source 140. If the first brightness $L_{ON}$ is less than the first threshold TH1, then the controller will further compares the first brightness $L_{ON}$ and the second threshold TH2 in step S408. If the first brightness $L_{ON}$ is less than the second threshold TH2, the duty cycle of the pulse width modulation signal $S_{PWM}$ is increased, which increases the output power of the illumination light source 140. If the first brightness $L_{ON}$ is between the first threshold TH1 and the second threshold TH2, the controller 120 maintains the original duty cycle setting of the pulse width modulation signal $S_{PWM}$. Thus, in the embodiment, adjusting the illumination light source brightness $L_S$ is achieved through adjusting the duty cycle of the pulse width modulation signal $S_{PWM}$ by the controller 120.

Besides adjusting the duty cycle of the pulse width modulation signal $S_{PWM}$, it could also adjust the illumination light source brightness $L_S$ by adjusting the current Ic. In an embodiment of the invention, when the first brightness $L_{ON}$ is greater than a first threshold TH1, the driver 130 reduces the current Ic, to reduce the output power of the illumination light source 140 (step S410). When the first brightness $L_{ON}$ is less than a second threshold TH2, the driver 130 increases the current Ic, to increase the output power of the illumination light source 140 (step S412).

In addition, as previously mentioned, the illumination light source brightness $L_S$ is equal to the difference of the first brightness $L_{ON}$ subtracting the second brightness $L_{OFF}$. In an embodiment of the invention, the controller 120 determines whether the operation of the illumination light source 140 is abnormal according to the difference between the first brightness $L_{ON}$ and the second brightness $L_{OFF}$ (the illumination light source brightness $L_S$). In detail, if the obtained illumination light source brightness $L_S$ and the expected brightness are extremely different, then something abnormal probably happened to the illumination light source 140 (such as LED aging). Under such condition, the controller 120 then sends out a communication signal, to inform related personnel for maintenance.

Generally, the embodiment of the invention achieves at least one of the following advantages. The illumination device causes a single light detecting element to respectively detect a road brightness illuminated/not illuminated by the illumination light source based on the potential of the pulse width modulation signal, through a time division multiplexing method. Thus, there is no requirement for a plurality of light detecting elements and the cost of the illumination device is reduced. In addition, two thresholds control the output power of the light source, and cause the brightness of the illuminated environment to be stable, avoiding flickering in the light source from rapid changing in the brightness of the environment.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A method of controlling an illumination device, comprising:
    producing a pulse width modulation signal;
    providing a current to an illumination light source of the illumination device such that the illumination light source emits light and detecting a first brightness of an environment illuminated by the illumination light source through a light detecting element when the pulse width modulation signal is at high potential; and
    stopping providing the current to the illumination light source and detecting a second brightness of the environment illuminated by the illumination light source through the light detecting element when the pulse width modulation signal is at low potential.

2. The method as claimed in claim 1, further comprising:
    decreasing a duty cycle of the pulse width modulation signal when the first brightness is greater than a first threshold; and
    increasing the duty cycle of the pulse width modulation signal when the first brightness is less than a second threshold;
    wherein the first threshold is greater than the second threshold.

3. The method as claimed in claim 1, further comprising:
    decreasing the current when the first brightness is greater than a first threshold; and
    increasing the current when the first brightness is less than a second threshold;
    wherein the first threshold is greater than the second threshold.

4. The method as claimed in claim 1, further comprising:
    determining whether the illumination light source operates abnormally according to a difference between the first brightness and the second brightness.

5. The method as claimed in claim 1, wherein the illumination light source comprises at least one light emitting diode.

6. An illumination device, comprising:
    an illumination light source, for illuminating an environment;
    a light detecting element, for detecting brightness in the environment;
    a controller, coupled to the light detecting element, for producing a pulse width modulation signal; and
    a driver, coupled to the controller and the illumination light source,
    wherein the driver of the illumination device provides a current to the illumination light source so the illumination light source emits light and the light detecting element detects a first brightness of the environment illuminated by the illumination light source when the pulse width modulation signal is at high potential;
    the driver stops providing current to the illumination light source and the light detecting element detects a second brightness of the environment illuminated by the illumination light source when the pulse width modulation signal is at low potential.

7. The illumination device as claimed in claim 6, wherein the controller decreases a duty cycle of the pulse width modulation signal when the first brightness is greater than a first threshold; the controller increases the duty cycle of the pulse width modulation signal when the first brightness is less than a second threshold; and the first threshold is greater than the second threshold.

8. The illumination device as claimed in claim 6, wherein the driver decreases the current when the first brightness is greater than a first threshold; the driver increases the current when the first brightness is less than a second threshold; and the first threshold is greater than the second threshold.

9. The illumination device as claimed in claim 6, wherein the controller determines whether the illumination light source operates abnormally according to a difference between the first brightness and the second brightness.

10. The illumination device as claimed in claim 6, wherein the illumination light source comprises at least one light emitting diode.

* * * * *